United States Patent

Kim

[15] 3,671,428
[45] *June 20, 1972

[54] LIGNIN DERIVATIVE

[72] Inventor: Chung Sur Youn Kim, Sacramento, Calif.
[73] Assignee: Georgia-Pacific Corporation, Portland, Oreg.
[ * ] Notice: The portion of the term of this patent subsequent to Jan. 27, 1987, has been disclaimed.
[22] Filed: Feb. 20, 1970
[21] Appl. No.: 13,186

Related U.S. Application Data

[62] Division of Ser. No. 629,894, April 11, 1967, Pat. No. 3,538,071.

[52] U.S. Cl. .......................252/8.5 M, 252/8.5 P, 252/353, 252/354, 252/355, 252/356, 252/357, 260/124 R, 260/124 A
[51] Int. Cl. .......................................C10m 1/40, C10m 1/32
[58] Field of Search ..................252/8.5 M, 8.5 P, 353, 354, 252/355, 356, 357

[56] References Cited

UNITED STATES PATENTS

| | | | |
|---|---|---|---|
| 2,935,504 | 5/1960 | King et al. | 252/8.5 X |
| 3,232,870 | 2/1966 | Cowan et al. | 252/8.5 |
| 3,492,228 | 1/1970 | Kim | 252/8.5 |
| 3,538,071 | 11/1970 | Kim | 252/8.5 |

*Primary Examiner*—Herbert B. Guynn
*Attorney*—Peter P. Chevis

[57] ABSTRACT

Lignin derivatives, particularly for use in oil base drilling muds, are obtained by reacting an oxidized lignin with an amine to form a salt and heating the resulting salt to elevated temperatures until a substantial portion of the product is converted to a nitrogen containing product wherein the nitrogen is stable in an aqueous alkaline medium at room temperature.

14 Claims, No Drawings

LIGNIN DERIVATIVE

This application is a divisional application of application Ser. No. 629,894, filed Apr. 11, 1967, now U.S. Pat. No. 3,538,071.

Lignin is a polymeric substance of substituted aromatics found in plant and vegetable tissue associated with cellulose and other plant constituents. In the pulp and paper industry, lignin-containing materials such as wood, straw, corn stalks, bagasse, and other vegetable and plant tissues are processed to recover the cellulose or pulp with the lignin being obtained as a by-product. Since vegetable and plant tissues generally contain an appreciable portion of lignin, a large amount is available. While considerable effort has been expended to find ways to utilize more fully the chemical values of lignin, only limited markets for lignin have been developed. Sulfonated lignin-containing materials have been used in relatively a small field of application as dispersing agents and for the preparation of drilling mud additives. While the sulfonated lignin-containing material drilling mud additives have been used in both oil base and water base drilling fluids, their most extensive use has been limited to water base fluids. Oil base drilling fluids, particularly water-in-oil emulsion type muds, have characteristics which in some respects make them superior to water base drilling fluids, especially for deeper wells in which the conditions are more drastic and demanding.

It is, therefore, an object of this invention to provide a lignin derivative having improved surface active properties. Another object is to provide a nitrogen-containing lignin derivative and a process for its preparation. A still further object is to provide a lignin derivative, especially effective as an additive in water-in-oil emulsion drilling fluids and compositions thereof.

The above and other objects are attained by intermixing the polymeric constituents of an oxidized lignin product with a primary or secondary amine having substituents of from six to 30 carbon atoms to interact the amine with the lignin derivative and heating the reaction product.

The composition thus obtained has improved surface active properties. The compositions are especially useful as a drilling fluid additive, particularly for water-in-oil type emulsions where they function as fluid loss and emulsifying agents. As drilling fluid additives they have high temperature stability and do not lose their effectiveness in the presence of strong alkali or contaminants.

Lignin obtained by any method or from any source may be oxidized and used in the preparation of the compounds of this invention. While there is some variation in the chemical structure of lignin products, depending upon the plant from which the lignin is obtained, place where the plant is grown, and also upon the method used in the recovery or isolation of the lignin from the plant tissue, the basic structure and properties of the lignin are similar with the variations being unimportant for the current purpose. The molecular weight of the monomer or the building unit making up the large polymer of lignin has not been definitely determined but is considered by many in the industry to be about 840. A unit of this size has been considered to be necessary to obtain the basic chemical properties of lignin. The lignin products obtained from plant tissue by a normal pulping process such as the sulfite pulping process contain lignin molecules of varying size from one or several building units up to well in the hundred thousands molecular weight.

As with any high molecular weight polymeric material, the results of molecular weight determinations of lignin vary somewhat depending upon the method employed for the determination. The method used herein for the determination of molecular weight is the agar gel diffusion method as developed and described by J. Moacanin, H. Nelson, E. Beck, V. F. Felicetta and J. L. McCarthey in J. Am. Chem. Soc. 81, 2054 (1959).

Since lignin is found associated with cellulosic materials in vegetable and plant tissue, one of the main sources of lignin is the residual pulping liquor obtained in the pulp and paper industry where lignocellulosic materials are processed to recover the cellulose or pulp. The lignin as obtained by separation of the cellulosic constituents from the plant may be chemically altered somewhat and not as it is found in the plant. Thus, the term "lignin product" as used herein means the lignin product which is obtained upon separation from the cellulose or recovered from the plant. In the sulfite pulping process, the lignocellulosic material is digested with a bisulfite or sulfite resulting in the sulfonation of the lignin. In other methods of recovery or separation of the lignin from the plant, the lignin may not be sulfonated but may be chemically altered somewhat in some other manner. For example, residual pulping liquors obtained in the sulfate process or kraft process (as well as "alkali lignin" obtained from the pulping of lignocellulosic materials by other alkaline processes) may contain the lignin as some alkali metal compound and may be partially oxidized. "Hydrolysis lignin" obtained from the hydrolysis of the lignocellulosic materials in the manufacture of wood sugars and "hydrotropic lignin" derived from the hydrotropic pulping process may likewise have the lignin altered somewhat from that found in the plant. However, the basic polymeric lignin structure is present which upon oxidation will give basically the same or similar degradation products and thus are operative. Also, the lignin products such as a residual pulping liquor may be subjected to various treatments such as, for example, acid, alkaline, or heat treatments or reaction with other chemicals which may further alter somewhat the lignin constituents. The lignins remain operative as long as the treatment is not so severe as to destroy the basic polymeric structure of the lignin or condensed to an excessively higher molecular weight.

The term "polymeric constituents," as used herein, means the water soluble high molecular weight constituents, ranging in molecular weight from the high molecular weight components which are just soluble in water down to those having a diffusion of about 25 mm$^2$/day, recovered from an oxidized lignin.

The residual pulping liquors or the lignin-containing product obtained in the separation or recovery of the lignin from the plant may contain many other constituents besides the lignin. For example, in the sulfite pulping process, the spent sulfite liquor contains lignosulfonate which may be present as salts of certain cations such as magnesium, calcium, ammonium, sodium and others which may have been present during the sulfonation of the lignin. The spent sulfite liquor generally contains only about 40 to 60 weight percent of lignosulfonate with the remainder being carbohydrates and other organic and inorganic constituents dissolved in the liquor. Lignin products obtained by other pulping processes may likewise contain other materials such as carbohydrates, degradation products of carbohydrates and resinous materials which are separated from the lignocellulosic materials with the lignin. Lignin obtained by hydrolysis of the lignocellulosic materials may not contain the carbohydrate but may contain resinous type materials as well as other materials which were not removed by the hydrolysis. It is not necessary to separate the lignin-containing constituents from the other constituents. The lignin product as obtained with all constituents may be oxidized or the liquors may be subjected to different treatments such as, for example, alkaline, acid or heat treatments, as well as reacted with chemicals to modify or remove some of the constituents prior to oxidation.

The term "oxidized lignin," as used herein in reference to lignin, means subjecting the lignin product to oxidation to the extent that the oxidized lignin product has a carboxyl radical content, expressed as —COOH, of at least 8 weight percent.

In oxidizing the lignin product, the various known methods of oxidation may be used. Lignins are very susceptible to oxidation and appreciable oxidation of the lignin molecule is obtained even under relatively mold oxidizing conditions. The oxidation may be carried out under acid, neutral or alkaline conditions and with various oxidizing agents. Illustrative examples are oxidizing agents such as oxygen, air, ozone, peroxides, halogens, halogen oxides, permanganates, chlorites, hypochlorites, chlorates, chromates, metal oxides such as oxides of copper, silver, cobalt, mercury and lead, mineral acids such as nitric, oxides of nitrogen and organic oxidizing agents such as nitrobenzene, nitromethane, peracetic acid, and nitrotoluene. Heating of the lignin under alkaline conditions such as obtained in a kraft pulping process may be sufficient to oxidize the lignin to be operative. In addition to using chemical oxidizing agents, other means such as electrolysis or enzymatic oxidation may also be used. The oxidation may be carried out under relatively low temperatures but temperatures up to 180° C are often used and temperatures up to 210° C or higher may be used depending upon the oxidizing agent or method employed. Catalysts may also be used, for example, metal oxides.

The oxidation is carried out to the extent that the oxidized lignin product will contain at least 8 percent, preferably at least 10 percent, of carboxylic radicals, calculated as the carboxylic acid groups, as determined by conductometric titration. While in the oxidation some carboxylic acid groups may be introduced into the polymeric constituents, it is believed that other reactions are effected due to the oxidation which are largely responsible for the effectiveness of the product. Lignin contains hydroxyl and methoxyl substituents which upon oxidation result in the formation of various types of polymeric compounds and lower molecular weight compounds such as vanillin and other aromatic products. Since the lignin products generally contain many other constituents besides lignin, for example, carbohydrates, many of these constituents are possibly converted to relatively low molecular weight acids which are later on separated from the polymeric constituents. Thus, the carboxyl content the lignin oxidation product does not necessarily indicate the carboxyl content of the polymeric constituent, but is only indicative of the oxidation to obtain the effective products. The lignin product can be oxidized to the extent that only a small amount of high molecular weight of polymeric constituents remain. However, for practical purposes, continuing the oxidation decreases the yield of polymeric constituents so that the oxidation generally is not continued beyond the point where the carboxyl radical content, expressed as —COOH, is over 35 weight percent of the oxidized product.

The polymeric constituents may be recovered from the resulting oxidized product prior to the reaction with the amine and heating. Since the polymeric constituents are the high molecular weight constituents, they generally form amine salts which have limited solubility in an aqueous medium. Thus, the separation may be made by the addition to the oxidized product of the desired primary or secondary amine to precipitate these constituents. The amine salt thus obtained can be heated to obtain the desired product. However, this means of isolation is not necessary. The polymeric constituents can be recovered by other known methods, for example, by dialysis, electrodialysis, ion exchange, or acid precipitation as well as solvent extraction. Also, for the separation of the polymeric constituents by precipitation of the amine salt, it is not necessary to use the primary or secondary amine desired in the final product. Tertiary amines may be used which will form amine salts having a limited solubility. However, after the salts are recovered with tertiary amines, the amine salts have to be reacted with a base and an acid or other means used to convert the polymeric constituents to the acid form and then reacted with the primary or secondary amine to obtain the desired amine salt to be subjected to heating. Thus, generally, the oxidized product is intermixed with the amine and the amine salt of the polymeric constituents is precipitated, or extracted with organic solvent, if it does not have the necessary limited solubility to precipitate. Solvents such as chloroform, butanol, benzene, perchlorethylene, xylene and toluene may be used. Also, depending upon the method of recovery used, some of the lower molecular weight degradation products may also be recovered which may react with the desired amine. Generally these products, including the sugar degradation products, have some effectiveness so that their presence is not necessarily detrimental.

While the recovered polymeric constituents may contain carboxyl radicals or other constituents containing carboxyl radicals may be recovered with the polymeric constituents which radicals may react with the amine to form an amine salt, it is believed that the amine also reacts with other functional groups in the polymeric constituents. Upon heating the reaction product of the amine and the polymeric constituents, the product obtained is substantially insoluble in an aqueous alkaline medium. The nitrogen in the product is likewise stabilized by the heating in that it is not readily removed from the heated product by an alkali in an aqueous medium at room temperatures.

Usually the polymeric constituent mixture or reaction product is heated at a temperature from about 120° C to just below the thermal decomposition temperature of the product such as a charring temperature. A temperature in the range of 145° to 185° C is preferred, and it is seldom that temperatures above 200° C are employed. The time the reaction product must be subjected to the high temperature will vary with the temperature employed. At the higher temperatures, 5 to 10 minutes or just the time necessary to heat the mixture to a high temperature may be sufficient, while at lower temperatures it may be desirable to maintain the product at the low temperature for 1 to 2 days. At the preferred temperature of 145° to 185° C, generally the product is heated from about ½ to 16 hours.

Upon heating, the emulsification properties of the product improve for water-in-oil emulsions, especially when used under highly alkaline conditions under which many emulsifiers are ineffective. Usually when the products are to be used as emulsifiers for water-in-oil emulsion, the products are heated to the extent that the voltage required to break down the emulsion made with these products is at least 120 volts.

A further change noted as the result of the heating is an increase in the solubility of the product in diesel oil. For some of the products, a substantial portion of the amine reaction product may not be soluble in oil and may be separated from the oil by centrifugation. For example, a major portion of an amine reaction product prepared from a spent sulfite liquor which has been subjected to moderate oxidation by heating and air blowing may be, after drying, insoluble in oil. However, if the amine reaction product is heated, for example at 165° C, it is converted to a product which is soluble in diesel oil. The amount of material separated by centrifugation decreases with heating to the amount of the inorganic compounds expected to be found in the product as the result of its preparation which have not been removed. Generally, the amine reaction product is heated until the major portion or at least 50 percent is oil soluble.

In heating the polymeric constituent-amine product, preferably drying conditions are maintained. This does not mean that the conditions have to be anhydrous but that the moisture content is maintained sufficiently low in the reaction to favor a dehydrating reaction. This may be accomplished, for example, by mixing the polymeric constituents and amine in dry form and heating, or by heating the polymeric constituent-amine product precipitate as recovered from the reaction mixture by filtration or centrifugation at atmospheric pressure, or heating the polymeric constituent-amine product in a solvent which forms an azeotrope with water or otherwise having the water distilled off on heating.

The heating is also usually carried out at a pH of at least 4.5, preferably at a pH in the range of 6 to 9 or up to the pH of the reacting amine. The desired pH can be obtained by various methods. For example, the pH of the polymeric constituents can be lowered just sufficiently so that upon the addition of the amine the desired pH is obtained in the reaction mixture. However, the pH may also be adjusted by use of an amine or the addition of a small amount of an inorganic alkali to the reaction mixture or the amine of alkali intermixed with the reaction product during heating.

The primary and secondary amines which may be used are alkyl and aryl primary and secondary amines having substituents of from six to 30 carbon atoms. Amines having from 12 to 20 carbon atoms are preferred. Saturated and unsaturated amines may be used, including aryl amines. Illustrative examples are cyclohexanolethylamine, benzylethanolamine, fatty amines, purified or mixed, dodecylamine and dioctylamine.

The ratio of the amine intermixed is generally such that the nitrogen content, which is stable to alkali at room temperature in the heated product, represents an amount of the amine in the range of from 70 to 100 percent of the polymeric constituents. However, the amount of amine used may be as little as 35 percent of the polymeric constituents or up to 150 percent or more.

Characteristics and properties of the products may be varied somewhat by the variation of the degree of oxidation of the lignin as well as the choice of amine used in the formation of the product. Alkylamines having from about 12 to 20 carbon atoms will result in products having a good stability in oil and thus make preferred emulsifiers for water-in-oil emulsions. Generally the most effective additives for use in oil base drilling muds are obtained with polymeric constituents having a diffusion coefficient in the range of 8 to 20 mm$^2$/day.

When the product is used in oil base muds, the amount added can be widely varied from about 1.5 to 50 lbs per barrel. The products also have fluid loss properties and will appreciably decrease the fluid loss at concentrations above about 2 or 3 lbs/barrel. Other materials, such as weighting materials, clay, and other additives, usually used in the oil base drilling fluid may be also used in conjunction with the additive.

EXAMPLE I

An oxidized calcium base fermented spent sulfite liquor was used in the preparation of a fatty acid lignin derivative.

A fermented calcium base spent sulfite liquor was oxidized in the preparation of vanillin. After recovery of vanillin, the high molecular weight constituents were precipitated from the aqueous solution by slowly adding concentrated hydrochloric acid to the oxidized product until the pH of the solution became 1 to 2. The acid treated solution was filtered to recover the precipitated polymeric constituents which had a diffusion coefficient of about 19 mm$^2$/day and carboxylic acid content of about 11 percent as determined by conductometric titration.

The polymeric constituents in an amount of 50 g were intermixed with 40 g of commercial fatty amine mixture in 400 ml of toluene. The mixture of the amine with high molecular weight lignin constituents was placed in a bomb and agitated at 135° C for 20 hours, after which the toluene was evaporated to obtain the lignin derivative as a residue. The product was dried and pulverized by a Waring blender and weighed 85 g. The analysis and properties of the lignin derivative compared to that of the reactant are shown in the table below.

| Analysis | Lignin Isolated as Precipitate at pH 2 | Derivative |
| --- | --- | --- |
| % Na | 10.0 | 1.8 |
| % Cl (organic) | 0 | 0 |
| % Cl (inorganic) | 2.7 | 0.9 |
| % Nonsulfonate S | 0.6 | 0.6 |
| % OMe | 12.0 | 6.4 |
| % N (Kjeldahl) | 0 | 2.5 |
| Solubilities | | |
| Diesel oil | insoluble | slightly soluble in cold soluble in hot oil |
| acetone | insoluble | very slightly soluble |
| benzene | almost insoluble | soluble |
| chloroform | almost insoluble | soluble |
| 95% ethanol | slightly soluble | almost insoluble in cold |

To illustrate the surface active properties of the lignin derivative, the product was tested as an emulsifier for water-in-oil systems. The derivative in an amount of 10 g was intermixed with 200 ml of diesel oil and about 1 g of sodium hydroxide as a 25 weight percent solution. Saturated salt brine in an amount of 150 ml was slowly added and the mixture was vigorously mixed for 20 minutes. The emulsion obtained at this point was stable and a voltage of 180 volts was required to obtain a current flow through the emulsion as tested by a Fann Emulsion Tester. Further additions of brine were made while the emulsion was mixed until a phase inversion or coagulation of the water-in-oil emulsion occurred. Fourteen hundred milliliters of brine were added before the phase inversion was obtained indicating that the lignin derivative was a good water-in-oil emulsifier. Under the above tests, emulsifiers which permit the addition of 1,000 ml or more of saturated brine before a phase inversion are considered to be good emulsifiers.

EXAMPLE II

An oxidized spent sulfite liquor obtained upon the oxidation of the liquor in preparation of vanillin similar to that described in Example I was used in the preparation of an n-hexylamine derivative.

The polymeric constituents of the degraded lignin were precipitated from the vanillin raffinate by addition of hydrochloric acid until a pH of 1 was obtained. The precipitated lignin constituents were recovered by centrifugation. The soluble portion of the raffinate was extracted with hexylamine to recover minor amounts of degraded lignin constituents which had failed to precipitate.

The amine extract and the precipitate were sealed in a bomb with an additional 70 ml of hexylamine. The bomb was agitated and heated overnight at a temperature of about 130° C.

The reaction product was washed with hydrochloric acid solution having a pH of 1. After the acid wash, the hexylamine derivative was dissolved in a 5 weight percent sodium hydroxide solution and the unreacted amine removed by contacting the solution with ether to extract the amine and other ether soluble constituents. The solution was then neutralized to a pH of 6.5, precipitating the hexylamine derivative.

EXAMPLE III

A nitrogen-containing lignin derivative was prepared from an oxidized spent sulfite liquor.

A fermented calcium base spent sulfite liquor was oxidized by bubbling chlorine slowly into spent sulfite liquor solution at 20° C. The chlorination of the lignosulfonate continued precipitating the higher molecular weight constituents. The precipitated constituents, in an amount of 300 g, after washing were dissolved in a 10 weight percent sodium hydroxide solution and heated at 80° to 90° C for 7 hours. The alkaline treated mixture was then cooled and acidified to a pH of about 1 to precipitate the polymeric constituents. The precipitated polymeric constituents were washed once with a diluted HCl solution and twice with ether and dried at room temperature to yield 151 g. The polymeric constituents had a diffusion coefficient of 8.7 mm$^2$/day.

The polymeric constituents in an amount of 50 g were intermixed with 40 g of fatty amine mixture and 4 g of isopropylamine in 400 ml of toluene. The reaction mixture was heated overnight with agitation at around 135° C. After the evaporation of the toluene and other volatiles and drying, 85 g of the lignin derivative was obtained.

The lignin derivative was tested as an emulsifier for water-in-oil emulsions in a manner similar to that described in Example I and 1,000 ml of salt brine were added before the phase inversion was obtained.

The analysis and properties of an oxidized spent sulfite liquor and of the lignin derivative are shown in the table below.

| Analysis | Precipitated Chlorinated Spent Sulfite Liquor | Alkaline Treated Constituent | Derivative |
| --- | --- | --- | --- |

| | | | |
|---|---|---|---|
| % N (Kjeldahl) | 0.0 | 0.0 | 2.9 |
| % Methoxyl | 2.1 | 3.2 | 1.5 |
| % Sulfonate S | 3.3 | 2.4 | 0.8 |
| % Nonsulfonate S | 0.4 | 0 | 0.1 |
| % Cl (organic) | 16.0 | 12.2 | 4.2 |
| % Cl (inorganic) | 2.8 | 1.6 | 3.9 |
| % Ca | — | 0 | 0 |
| % Na | — | 1.5 | 1.0 |
| Solubilities | | | |
| Diesel oil | insoluble | insoluble | soluble in hot oil |
| 5% NaOH | soluble | soluble | insoluble |
| 10% NaOH | soluble | soluble | insoluble |

EXAMPLE IV

A residual pulping liquor obtained from a kraft pulping process was diluted and neutralized with sulfuric acid to a pH of about 1, precipitating most of the lignin materials. The precipitate was filtered and washed with dilute sulfuric acid and water and dried. The recovered lignin constituents had a diffusion coefficient of about 6.2 mm²/day.

The recovered lignin constituents of the kraft liquor in an amount of 150 g were dispersed in 500 ml of water and chlorine gas was slowly bubbled into the mixture at a temperature of about 20° C. The chlorination was continued until about 74 g of chlorine had been absorbed. The chlorinated lignin constituents were recovered by filtration, washed with ether and dried. The above polymeric constituents were alkaline treated by dissolving the product in a 10 percent sodium hydroxide solution and maintained in the solution at about 80° C for 8 hours. The alkaline treated mixture was then acidified to a pH below 1 with concentrated hydrochloric acid to precipitate the polymeric constituents. The polymeric constituents were recovered from the acidified mixture by centrifuge and the product was washed with water and dried. The polymeric constituents had a diffusion coefficient of about 7.8 mm²/day.

The polymeric constituents thus obtained, in an amount of 50 g, were mixed with 40 g of fatty amine in about 400 ml of toluene. The reaction mixture was made slightly basic by the addition of 4 g of isopropylamine. The resulting mixture was then reacted in a bomb at a temperature of about 135° C overnight. Upon evaporation of the toluene and drying, 83 g of the lignin derivative was obtained.

The above derivative was tested as a water-in-oil emulsifier in the manner described in the examples above. About 1,200 ml of additional brine had to be added before inversion or coagulation of the emulsion was obtained.

The analysis and the properties of the lignin constituents recovered from the kraft liquor, the intermediate products obtained, and the final product are shown in the table below.

| | Lignin Material Isolated from Kraft Liquor | Chlorine Oxidized Product | Alkaline Treated Chlorine Oxidized Product | Lignin Derivative |
|---|---|---|---|---|
| Analysis | | | | |
| % N | — | — | — | 2.6 |
| % OMe | 11.8 | 7.7 | 8.1 | 3.5 |
| % Total S | 2.1 | 1.4 | 1.2 | 0.7 |
| % Cl (organic) | — | 10.5 | 0.0 | 0.4 |
| Solubility | | | | |
| Diesel oil (hot) | insoluble | insoluble | insoluble | mostly soluble |
| 5% aqueous NaOH | soluble | soluble | soluble | insoluble |
| 10% aqueous NaOH | soluble | soluble | soluble | insoluble |

EXAMPLE V

A nitrogen-containing lignin derivative was prepared from an air oxidized calcium base spent sulfite liquor.

A fermented calcium base spent sulfite liquor was used. To 28.5 kg of the liquor containing 10 kg of the spent sulfite liquor solids, 12.5 kg of a 50 percent sodium hydroxide solution was added. The mixture was heated to about 95° C in a steam-jacketed vessel and air blown into the vessel through a sparger at a rate of 13.9 cu ft/min for 19.5 hours. Water was added as necessary to maintain a constant liquid level. The carboxyl content, expressed as acid, of the oxidized product was 13.6 percent, based upon the spent sulfite liquor solids. An ultraviolet absorption spectrum analysis of the oxidized product indicated that the product contained ultraviolet absorbing constituents, as lignosulfonic acid, in an amount of 46.3 percent of the solids.

To 13.6 kg of the oxidized product, a sulfuric acid solution containing 50 percent sulfuric acid was added to acidify the mixture to a pH of 3.5. The product was then heated to 50° C and 2.6 kg of a primary tallow amine was added. The product was heated with vigorous stirring until a temperature of 90° C was reached, after which the mixture was allowed to cool at room temperature. The reaction product precipitated black in color and granular in form. This precipitate was recovered in an amount of 4 kg by filtration through a 60-mesh screen. The product was air dried.

Various samples of the air dried amine salt were heated at about 165° C for various lengths of time. The products thus obtained were tested for solubility in diesel oil and for emulsifying properties by determining the emulsion breakdown voltage. The emulsion breakdown voltage was determined for the emulsion at two sodium hydroxide levels. The results obtained are shown below.

| Sample Heated, Hours at 165°C | % of Sample Soluble in Diesel Oil | Emulsion Breakdown Voltage, 1 ml NaOH | Emulsion Breakdown Voltage, 5 ml NaOH |
|---|---|---|---|
| 0 (Air Dried) | 14.8 | — | 60 |
| 1 | 30.6 | 70 | 90 |
| 2 | 64.2 | 260 | 160 |
| 3 | 67.6 | 280 | 160 |
| 4 | 70.6 | 280 | 180 |
| 5 | 73.0 | 400 | 190 |
| 6 | 72.0 | 410 | 200 |
| 7 | 74.0 | 480 | 300 |

Diesel oil solubility was determined by suspending 5 g of a sample in 150 ml of diesel oil in a weighed centrifuge bottle. The product was then heated in a water bath at 95° C for 2 hours with occasional stirring and then cooled and centrifuged to settle the insolubles. The insoluble material was washed twice with petroleum ether to remove all the diesel oil and then heated overnight at 110° C to remove the petroleum ether prior to weighing.

Emulsion stability tests were made by measuring the emulsion breakdown voltage of saturated salt brine water-in-oil emulsions prepared by stirring 3 g of the sample and 1 ml of 20 percent sodium hydroxide into 40 ml of diesel oil for 5 minutes and then adding 30 ml of saturated salt brine. The mixing was continued for 30 minutes and then the emulsion breakdown voltage was measured with a Fann Emulsion Tester. The emulsion stability test as described above was repeated except that instead of adding 1 ml of 20 weight percent sodium hydroxide solution, 5 ml were added and the emulsion breakdown voltage determined.

EXAMPLE VI

A nitrogen-containing lignin derivative was prepared from a residual pulping liquor from a kraft pulping process without further oxidation of the liquor. The kraft pulping liquor had a carboxyl content of about 12.2 percent expressed as acid radicals.

The polymeric constituents were precipitated from the kraft liquor, containing 30.6 percent solids, by acidifying the liquor to a pH of about 3.5 by addition of hydrochloric acid. The polymeric constituents thus recovered represented 63 percent of the total kraft liquor solids and had a carboxyl content of 10.3 percent.

About 20 g of the precipitated constituents were slurried in 240 g of water and 20 g of fatty acid amine added. The mixture was heated to about 85° C and then cooled. The pH of the aqueous phase of the reaction mixture after the addition of the amine was 8.0. The reaction product was recovered from the reaction mixture by filtration and heated in an oven at 145° C for 16 hours. Upon testing the heated product, an emulsion breakdown voltage of 480 volts was obtained with the product for the emulsion stability test described in Example V for emulsions containing 1 ml of sodium hydroxide and also 5 ml of hydroxide.

What is claimed is:

1. An oil base drilling fluid composition which comprises a continuous oil phase fluid containing in effective amounts as an emulsifier a lignin derivative prepared by intermixing polymeric constituents of an oxidized lignin product with a primary or secondary amine having substituents selected from the group consisting of alkyl radicals having from six to 30 carbon atoms and phenyl radicals to form a salt, and heating the resulting salt of the amine and polymeric constituents at a temperature in the range of 120°C to the thermal decomposition of the resulting product until a substantial portion of the resulting product is converted to a nitrogen-containing product wherein the nitrogen is substantially stable in an aqueous alkaline medium at room temperature, said polymeric constituents being water-soluble constituents having a diffusion coefficient not greater than 25 mm$^2$/day, and said oxidized lignin product having a carboxyl radical content, expressed as acid radicals, of at least 8 weight percent.

2. A composition according to claim 1 wherein said oxidized lignin product contains from 10 to 35 weight percent of carboxyl radicals, expressed as acid radicals, and the resulting reaction product is heated at a temperature of 120° to 200° C.

3. A composition according to claim 2 wherein the oxidized lignin product is a residual pulping liquor obtained from a kraft pulping process.

4. A composition according to claim 2 wherein the oxidized lignin product is an oxidized spent sulfite liquor.

5. An oil base drilling fluid composition which comprises a continuous oil phase fluid containing in effective amounts as an emulsifier a lignin derivative prepared by intermixing polymeric constituents of an oxidized lignin product with a primary or secondary amine having substituents selected from the group consisting of alkyl radicals having from six to 30 carbon atoms and phenyl radicals to form a salt, and heating at a pH of at least 4.5 the resulting salt of the amine and polymeric constituents at a temperature of from 120° C to the thermal decomposition temperature of the reaction product until a substantial portion of the resulting product is converted to a nitrogen-containing product wherein the nitrogen is substantially stable in an aqueous alkaline medium at room temperature, said polymeric constituents being water-soluble constituents having a diffusion coefficient in the range of 8 to 20 mm$^2$/day, and said oxidized lignin product containing at least 8 weight percent of carboxyl radicals, expressed as acid radicals.

6. A composition according to claim 5 wherein the oxidized lignin product is an oxidized spent sulfite liquor.

7. A composition according to claim 5 wherein the oxidized lignin product is a residual pulping liquor from the kraft pulping process.

8. A composition according to claim 6 wherein the amine is an alkylamine having from 10 to 20 carbon atoms.

9. A composition according to claim 7 wherein the amine is an alkylamine having from 10 to 20 carbon atoms.

10. A composition according to claim 8 wherein the resulting salt of the polymeric constituents and the amine is heated under drying conditions at a temperature of from 120° to 200° C at a pH in the range of 6 to 9.

11. A composition according to claim 8 wherein the resulting salt of the polymeric constituents and amine is heated under drying conditions at a temperature in the range of 145° to 185° C for from one-half to 16 hours.

12. A composition according to claim 9 wherein the resulting salt of the polymeric constituents and the amine is heated under drying conditions at a temperature of from 120° to 200° C at a pH in the range of 6 to 9.

13. A composition according to claim 9 wherein the resulting salt of the polymeric constituents and the amine is heated under drying conditions in the range of 145° to 185° C for from one-half to 16 hours at a pH in the range of 6 to 9.

14. In a process of drilling a well the improvement which comprises circulating in the well a drilling fluid composition of claim 4.

* * * * *